(12) United States Patent
Crocker et al.

(10) Patent No.: US 7,707,704 B2
(45) Date of Patent: May 4, 2010

(54) SEALING METHODS

(75) Inventors: Robert Lye Crocker, Slough (GB);
Dominic Paul Edmund Barnard, Witney (GB); Trevor George Sanders, Workingham (GB)

(73) Assignee: Enterprise Managed Services Limited, Lancashire (GB)

( * ) Notice: Subject to any disclaimer, the term of this patent is extended or adjusted under 35 U.S.C. 154(b) by 389 days.

(21) Appl. No.: 11/604,168

(22) Filed: Nov. 22, 2006
(Under 37 CFR 1.47)

(65) Prior Publication Data
US 2007/0220733 A1 Sep. 27, 2007

Related U.S. Application Data

(63) Continuation of application No. 10/471,871, filed as application No. PCT/GB02/01149 on Mar. 13, 2002, now abandoned.

(30) Foreign Application Priority Data
Mar. 13, 2001 (GB) ................. 0106141.5

(51) Int. Cl.
*B21D 39/00* (2006.01)
(52) U.S. Cl. ..................................... 29/522.1

(58) Field of Classification Search ............. 29/522.1, 29/523, 525, 525.01, 432, 402.01, 402.02, 29/402.04, 402.05, 402.06, 402.19; 30/379; 409/143
See application file for complete search history.

(56) References Cited

U.S. PATENT DOCUMENTS 5,207,031 A 5/1993 Gammelgaard ............. 451/440

FOREIGN PATENT DOCUMENTS

| DE | WO96/12134 | 4/1996 |
|---|---|---|
| JP | 179672 | 11/1982 |
| JP | 61-135091 | 8/1986 |
| JP | 1-317745 | 12/1989 |
| WO | WO 91/12460 | 8/1981 |

*Primary Examiner*—John C Hong
(74) *Attorney, Agent, or Firm*—Blakely, Sokoloff, Taylor & Zafman LLP (57) ABSTRACT

The invention relates a method for providing reconnection to a ferrule to a service line from within the bore of a lined host pipe adapted to carry a fluid, comprising lining the host pipe with a liner, locating the ferrule from within the lined host pipe, forming a passage for fluid through the liner to the ferrule, and forming a seal of the liner with the system whereby to obviate leakage of fluid between the liner and host pipe.

16 Claims, 9 Drawing Sheets

Pushfit Without Enhancement
FIG. 3G

Pushfit With Enhancement
FIG. 3H

SEALING METHODS

The present patent application is a Continuation of Application Ser. No. 10/471,871, filed Sep. 12, 2003, now abandoned which is a non-provisional application of International Application No. PCT/GB02/01149, filed Mar. 13, 2002.

The invention relates to sealing methods, and particularly to a method for providing re-connection to a ferrule of a service line from within the bore of a lined host pipe.

Generally, the liner may consist of a polyethylene tube which is folded, often by being everted along its longitudinal axis to make it easier to be inserted in the host pipe as by being towed therethrough. Once in position the liner is reverted to a circular cross section by pressure to line the host pipe. Host pipes, or mains say for water, oil or gas, generally provide branch or service lines to say a property or dwelling.

Currently service lines are connected to a host pipe using a component called a ferrule which consists of a tube with a taper thread which is screwed into the wall of the host pipe which is usually cast iron. The other end of the ferrule is connected to the supply pipe to the property. The nature of ferrules mean they can protrude into the bore of the host pipe.

Host pipes often decay, and require refurbishment in order to main a supply via the service line. Previously it had been the practice to excavate ground round the main, remove it, and relay it. This is time consuming and expensive, so the practice of relining a pipe with a liner in situ without the need for excavation has been developed. Whilst this is less expensive than excavation it has the disadvantage of masking the ferrules, which are then inoperative. A passage has then to be opened from interiorly of the lined pipe to the ferrule.

It is an object of the invention to seek to provide a method which enables reconnection of a service line from a lined host pipe via a ferrule.

According to a first aspect of the invention there is provided a method for providing reconnection to a ferrule of a service line from within the bore of a lined host pipe adapted to carry a fluid, comprising lining the host pipe with a liner, locating the ferrule from within the lined host pipe, forming a passage for fluid through the liner to the ferrule, and forming a seal of the liner with the system whereby to obviate leakage of fluid between the liner and host pipe.

According to a second aspect of the invention there is provided a method for providing reconnection to a ferrule of a service line from within the bore of a lined host pipe adapted to carry a fluid, comprising the steps of locally enlarging a bore of a member of the ferrule/host pipe system, lining the host pipe with a liner, locating the ferrule from within the lined host pipe, forming a passage for fluid through the liner to the ferrule, and forming a seal of the liner with the system whereby to obviate leakage of fluid between the liner and host pipe.

The step of enlarging a member of the ferrule/host pipe system may comprise increasing the diameter of the bore of the ferrule. This assists in reconnection in a substantially leak-proof manner.

The step of increasing the diameter of the bore of the ferrule may comprise increasing the diameter over only part of the length of the ferrule from the host pipe, whereby to provide a stepped bore through the ferrule.

The increased diameter bore may be formed to a standard diameter, and may be carried out by a reaming step.

The step of locating the ferrule may comprise monitoring electrical impedance of an electrical coil adjacent the interior surface of the host pipe.

The step of forming a seal may comprise providing a connector device, and inserting said device in the ferrule from inside the host pipe and securing it in the ferrule whereby to seal the liner in position.

The step of forming a passage through the liner may comprise providing a connection device, and inserting said connection device through the liner into the enlarged part of the bore of the ferrule, whereby to engage the liner between the connection device and in the ferrule.

The step of forming a passage through the bore of the liner may comprise providing the connection device on an insertion device, inserting the insertion device into the bore by penetration through the liner to open said passage, and securing the connection device in the bore, with the liner secured to the host pipe and ferrule.

The connection device may be provided as a push-in connection device.

The push-in connection device may be provided with fastening means whereby it is retained in the enlarged part of the bore of the ferrule.

The fastening means may comprise inclined barb means.

Alternatively, the fastening means may comprise an enhancement whereby the liner is extruded into cavities created in the ferrule.

The insertion device may comprise a pointed end having an annular seating at an end opposite the pointed end, and the method may also comprise passing the connection device over the insertion device and supporting it on the annular sealing prior to penetration of the liner.

The step of locating the ferrule may comprise monitoring of electrical impedance of an electrical coil adjacent the interior surface of the host pipe.

According to a third aspect of the invention there is provided a method as hereinbefore defined, the ferrule/host pipe system comprising a plurality of ferrules, and the method may comprise the step of providing reconnection at each ferrule.

The method may comprise the step of locally enlarging a bore of each member of the ferrule/host pipe system to the same extent at each member.

The method may be carried out remotely by a robot inserted in the host pipe after lining of the host pipe with the liner.

Methods embodying the invention are hereinafter described, by way of example, with reference to the accompanying drawings.

Referring to the drawings, in which like parts are referred to by like reference numerals, there is shown a method for providing reconnection to a ferrule 1 of a service line via a bore 2 of the ferrule 1 from within a bore 3 of a lined host pipe 4 adapted to carry a fluid, comprising the steps of locally enlarging a bore 2 or 3 of a member of the ferrule/host pipe system 1, 4, lining the host pipe with a liner 5, locating the ferrule 11 from within the lined host pipe 4, forming a passage for fluid through the liner 5 to the ferrule 1, and forming a seal with the system whereby to obviate leakage of fluid between the liner and host pipe.

In all embodiments the host pipe 4 can be a main such as a water, oil or gas main, and the service line can be a branch pipe to carry say water from the host pipe 4 into a building such as a dwelling.

In practice, a host pipe 4 or main will have several service lines or branches, each of which serves a particular dwelling, and each of which is connected into the host pipe by a fitting usually known as a ferrule 1. The host pipe 4 is usually ferrous, while the ferrule 1 is usually non-ferrous, being made of brass, for example. The host pipe 4 can deteriorate over time, sometimes merely because of age, because of ground subsidence, (the host pipe and service lines are usually buried), or corrosion. To renovate them, and prolong their useful life, they are lined, usually with a polyethylene liner 5 which is everted, inserted into and then pulled through the host pipe, being reverted to the original cylindrical shape by pressure applied internally, usually by passing water into the everted liner. This results in the liner lining the host pipe, usually being firmly applied to the interior surface of the host pipe. The liner, being continuous, covers the ferrule(s), and thus potentially cuts off flow of fluid from the host pipe to the service line.

In methods embodying the invention, a passage is opened from the host pipe 4 through the liner 5 to the ferrule 1 and hence to the service line. This is achieved in the respective embodiments of FIGS. 1A to 2B by locally enlarging the bore 2 of the ferrule 1 prior to lining the host pipe 4 with the liner 5, In all embodiments, a standard-sized local enlargement in the ferrule/host pipe system can be formed. This thus ensures uniformity and where local enlargement of the bore of the ferrule is used, one operation can be used in whatever size of ferrule is inserted in the host pipe. Thus, it is often the case that different sizes of ferrule are used adjacent one another in a length of host pipe.

Using the method embodying the invention, a single enlarging device can be used, to provide uniform bore enlargements, which in turn means that standard connector devices, as described hereinafter, can be used.

Figure 1A:
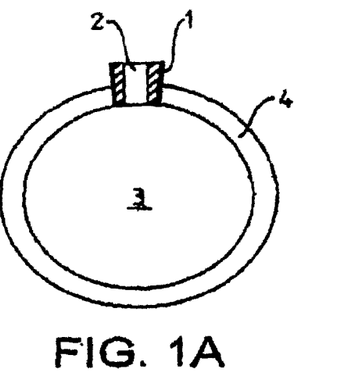
FIGS. 1A and 1B show schematically a host pipe with a ferrule mounted therein, FIG. 1A showing the ferrule as mounted in the host pipe and FIG. 1B the ferrule after a step in a method according to the invention.
Figure 1B:
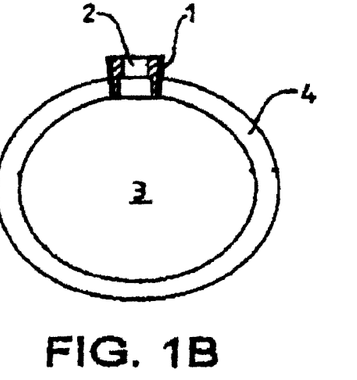

Referring now to FIGS. 1A and 1B, FIG. 1A shows schematically a ferrule 1 as inserted in a host pipe 4 before local enlargement of the through bore 2. The ferrule is screwed into the wall of the host pipe using a standard taper thread. As an initial step, the host pipe is usually cleaned, and the ferrule, which can project into the host pipe beyond the inner surface thereof, has been dressed as by grinding to be substantially flush with the internal surface of the bore 3 of the host pipe 4. The bore of the ferrule is then enlarged as shown in FIG. 1B to provide a standard diameter enlarged bore, the enlarging operation being by reaming, using a reaming device mounted on a robotic device 6 (FIGS. 3A-5C) inserted in the host pipe and positioned below the ferrule, positioning being achieved by either visual means such as a television camera or by magnetic induction means such as eddy current means, either of which is carried on the robotic device 6, which itself is controlled remotely and can travel along the host pipe 4 and be stationed at a desired position under a ferrule 1.

After the, or each ferrule in a length of host pipe has been prepared as shown in FIGS. 1A and 1B, the host pipe is lined with a liner 5 as shown in FIG. 10, being reverted to its circular cross section using water pressure, the water used for this being drained from the liner. The robotic device 6 is then launched into the lined pipe 4, and the position of the or each ferrule 1 is determined using an electromagnetic technique which in turn uses eddy currents, the eddy currents technique monitoring the impedance of an electrical coil close to the surface under inspection, in this case the ferrule/host pipe system 1, 4. Essentially as an instrument including the coil approaches the site of a particular ferrule, a change of impedance is detected, caused by the non-ferrous ferrule. A read-out at a remote location indicates the centre line of the ferrule to better than +/−0.5 mm. The sensor can sense the circumferential as well as the axial position of a ferrule.

Figure 2A:
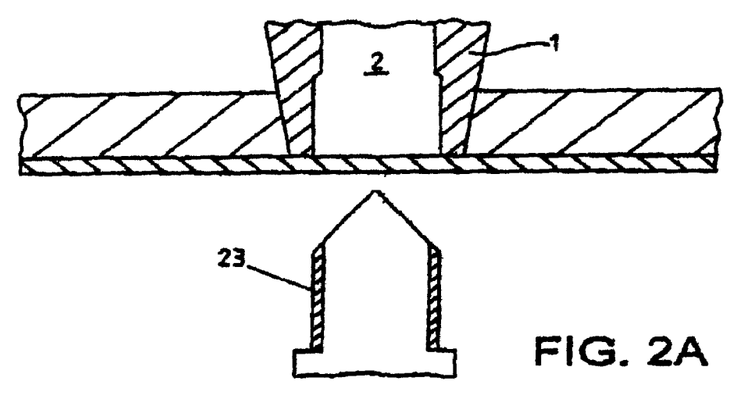
FIGS. 2A-2B show another steps in another embodiment of the method providing a passage through a liner in accordance with the invention.
Figure 2B:
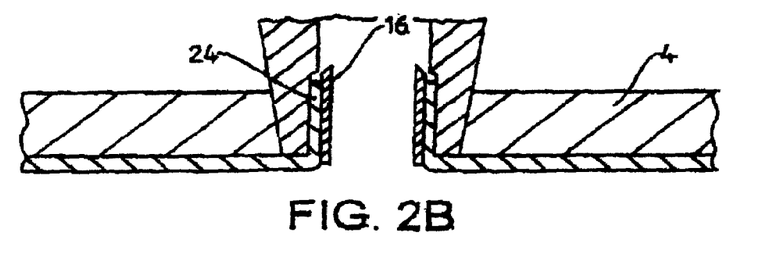
Figure 4A:
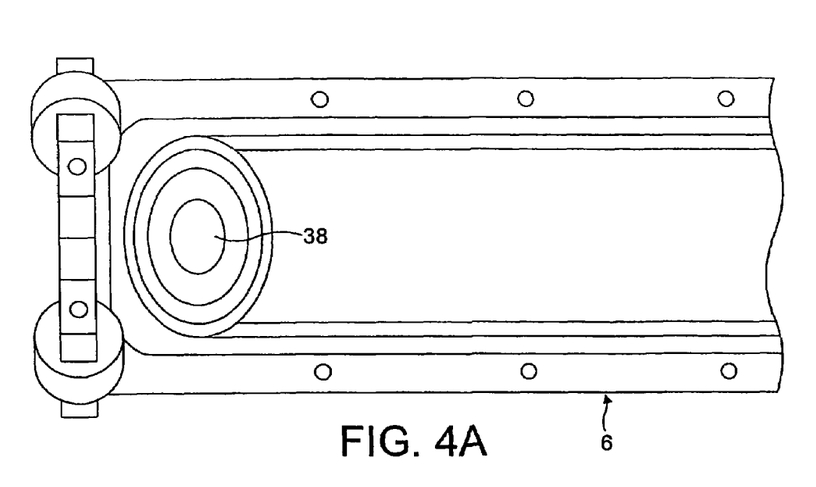
FIGS. 4A to 4C show respectively part of another embodiment of robotic device for use in a method according to the invention.

Referring now to FIGS. 2A-2B, there is shown a method embodying the invention which does not require removal of a disc of liner material to provide a passage through the liner 5 to the ferrule 1. In this case, the passage is formed by a push-in or boring method step to provide the passage. In this embodiment, after the ferrule bore enlargement step and pipe lining step, the connector device is inserted into the enlarged bore of the ferrule 1 by being mounted on an insertion device 23 which is pushed into the ferrule 1 through the liner, this action essentially extruding the liner 5 between the connector device 16 and the enlarged bore of the ferrule, as shown in FIGS. 2B at 24, FIG. 4A showing schematically the connector device about to be pushed into the prepared ferrule from below via as before a robotic device.

When the insertion finger 23 is withdrawn, the connector 16 stays anchored in the ferrule 1 with a fluid type seal between it and the ferrule and the liner whereby to open the passage for fluid flow between the host pipe and the ferrule.

Figure 3A:
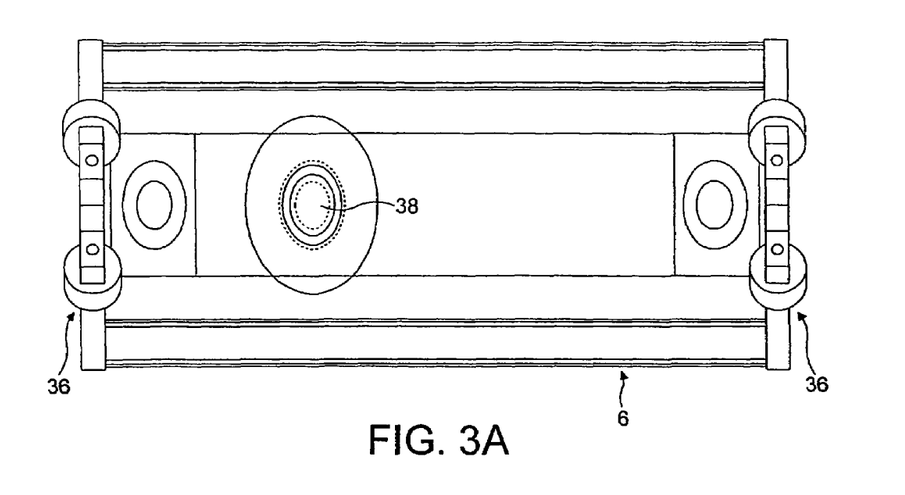
FIGS. 3A to 3H show respectively to an enlarged scale an embodiment of robotic device for use in a method according to the invention.
Figure 3B:
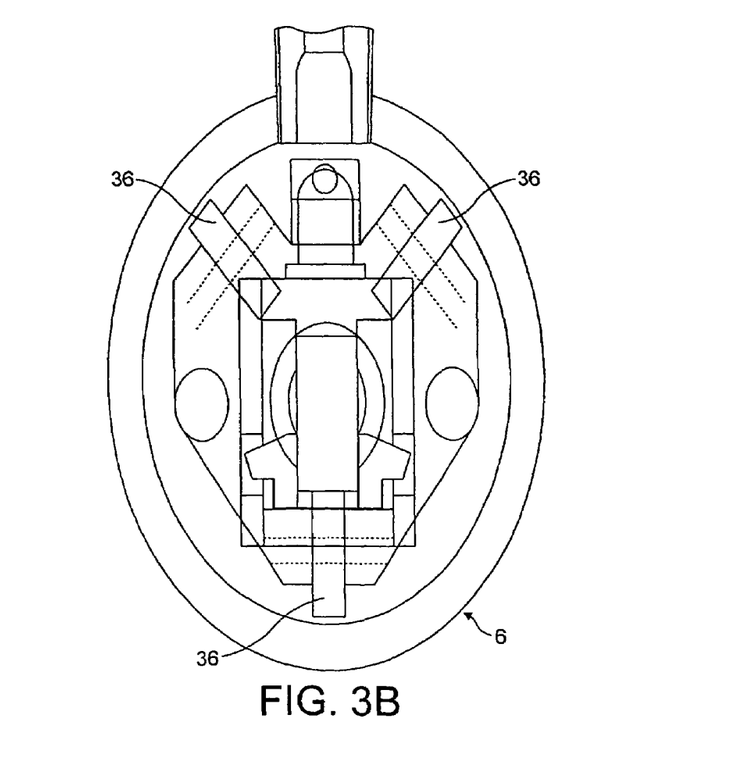
Figure 3C:
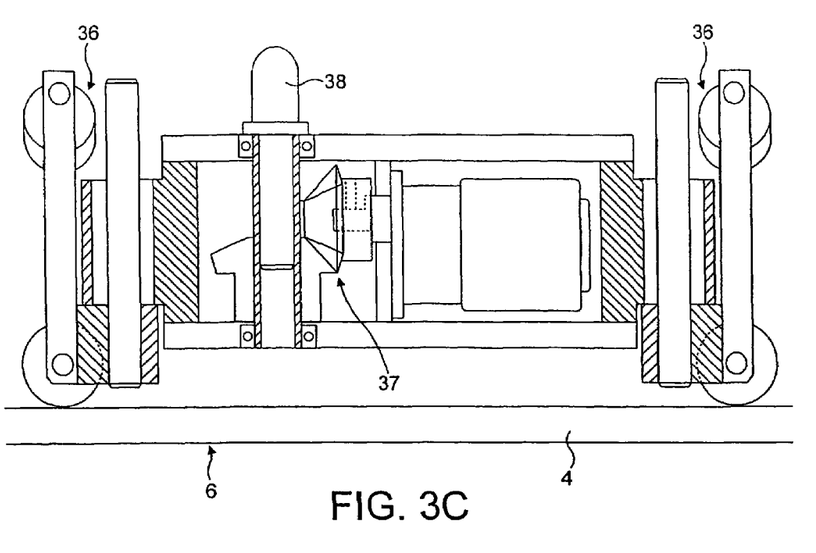

FIGS. 3A-3C show respectively a plan view, end view and part sectional view of one form of robot 6 providing a work station and which has equiangularly disposed bogies or wheels 36 at each end for running along the inner wall of the pipe 4 for moving the robot longitudinally of the pipe. There is a bearing arrangement 37 comprising a crown wheel and pinion which can raise and lower tools 28 as shown at X in FIG. 3C.

Using the method two separate but complimentary processes are provided.

Figure 3D:
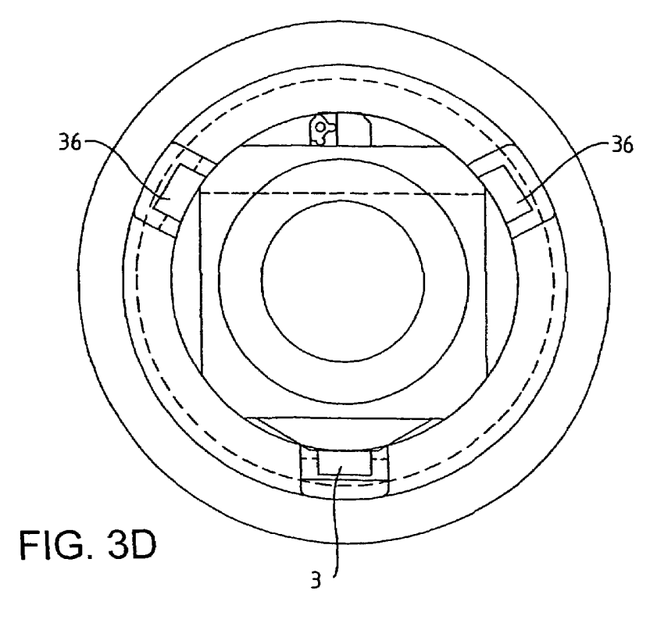
Figure 3E:
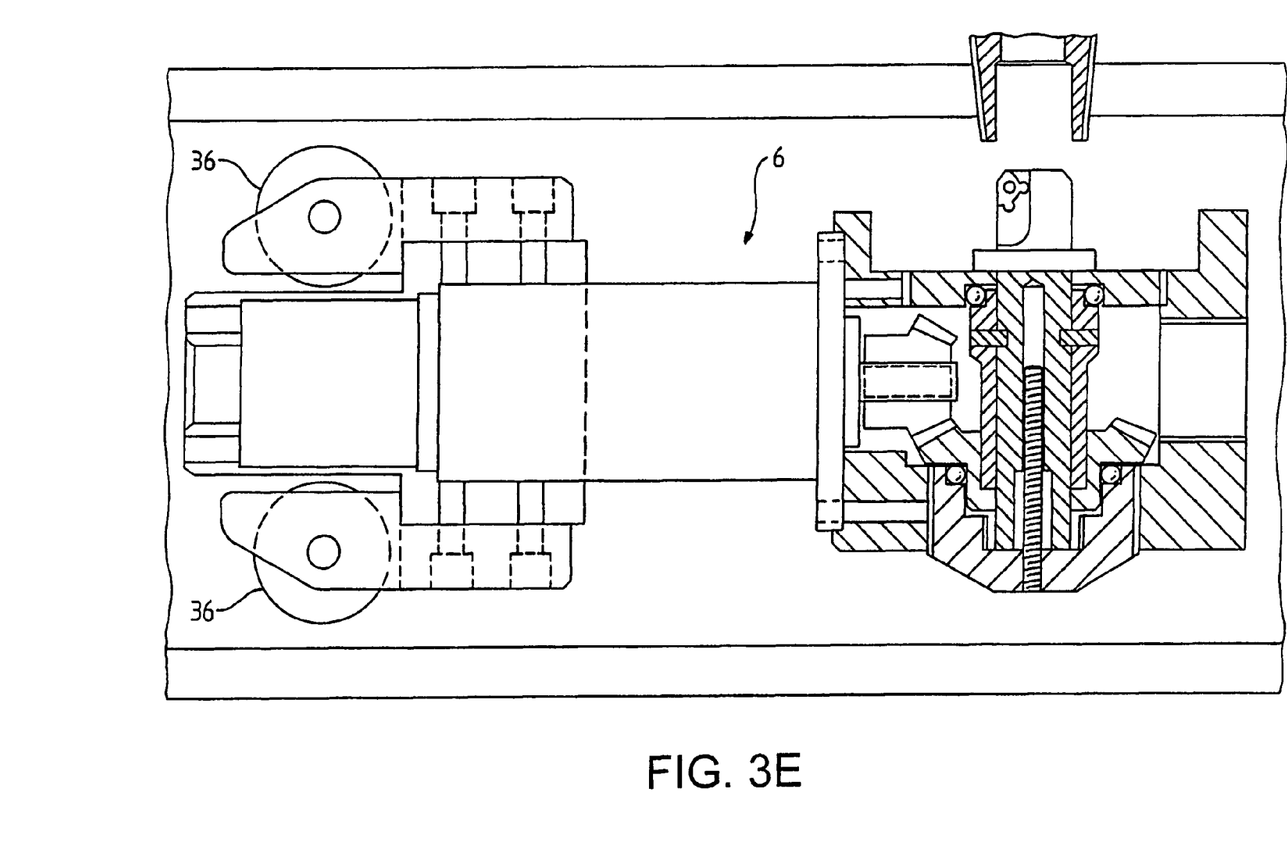

The first method involves the preparation by enlargement of the bore of the ferrule before insertion of the polyethylene liner to create a round bore of known and controlled diameter in the ferrule. A robot has been developed which passes along the bore of the pipe and carries out this process using ceramic cutters at each ferrule (FIG. 3D).

Figure 3F:
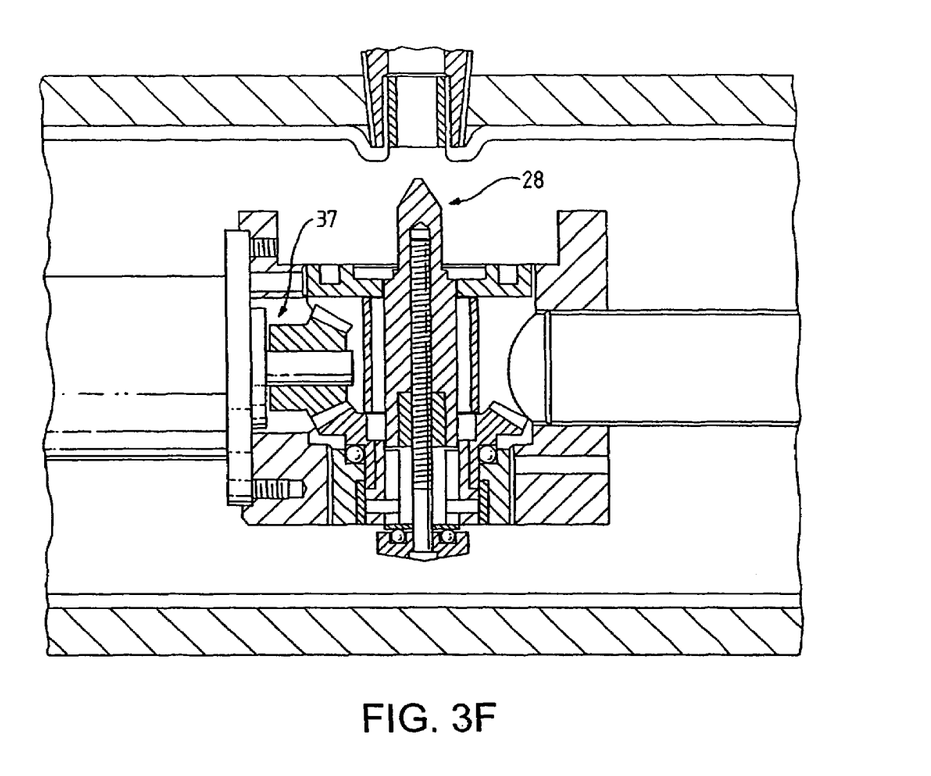
Figure 3G:
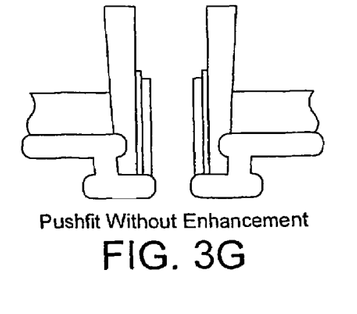

The second method occurs after the liner has been inserted and reverted to conform to the bore of the original main. A robot passes along the bore of the liner and at the site of each ferrule pushes a finger up into the bore of the ferrule, thus penetrating the wall of the liner. The finger carries a short tube of accurately known length and diameter, henceforth referred to as the connector, and as this is pushed into the bore of the ferrule by the finger it causes the polyethylene liner to extrude into the cylindrical cavity between the connector and the ferrule bore. At a prescribed depth of insertion the finger is stopped and withdrawn leaving the connector and the extruded polyethylene in the bore of the ferrule (FIGS. 3F and 3G).

This assembly has been shown to create an immediate and durable watertight connection between the bore of the liner and the ferrule.

Figure 3H:
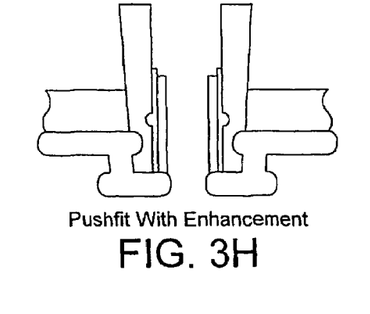

The connection also provides a strong tensile connection of the liner to the ferrule capable of withstanding any partial vacuum conditions that can occur. This is enhanced by creating grooves in the prepared bore of the ferrule and on the outer surface of the connector so that when the polyethylene extrudes it flows to fill these cavities and creates the effect of "barbs" or "latches" which prevent either the liner or the connector from withdrawing from the ferrule (FIG. 3H).

Figure 4B:
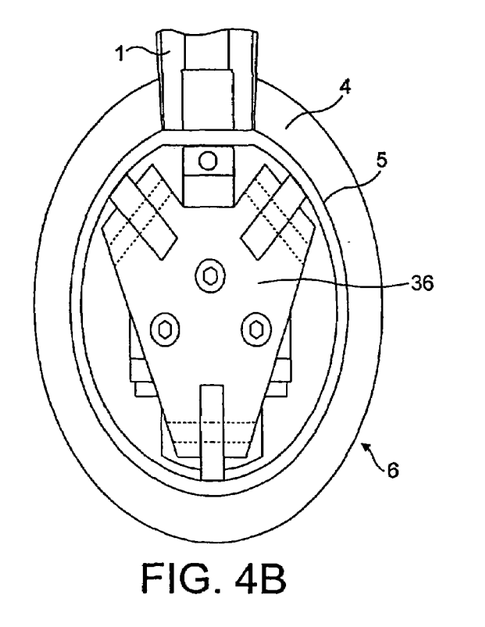
Figure 4C:
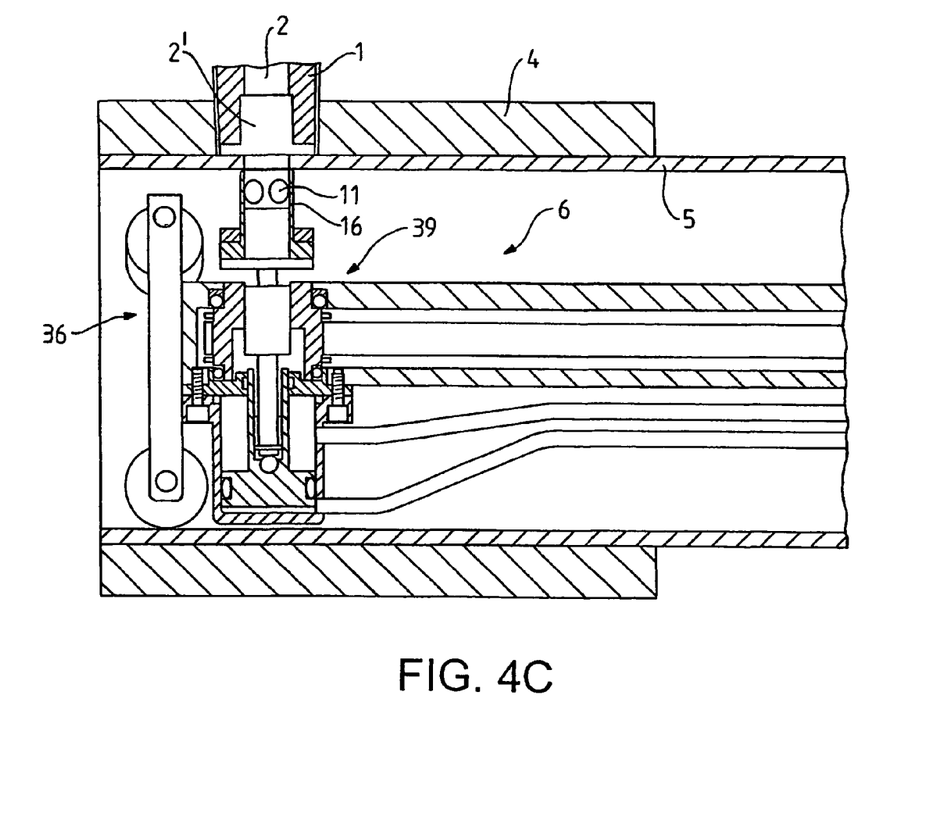

FIGS. 4A-4C show respectively a part of a robot including a robot arm for in this case fitting a connector in a 3 inch diameter pipe there being a double acting hydraulic cylinder and piston arrangement to apply both a raising and lowering action and a withdrawal action, FIG. 4C in part cross sectional view showing a device in which on rotation as the insertion finger rises into the bore, balls 11 are radially forced outwardly to deform the wall of the connection device 16 to engage the ground out part of the wall of the ferrule 1.

Figure 5A:
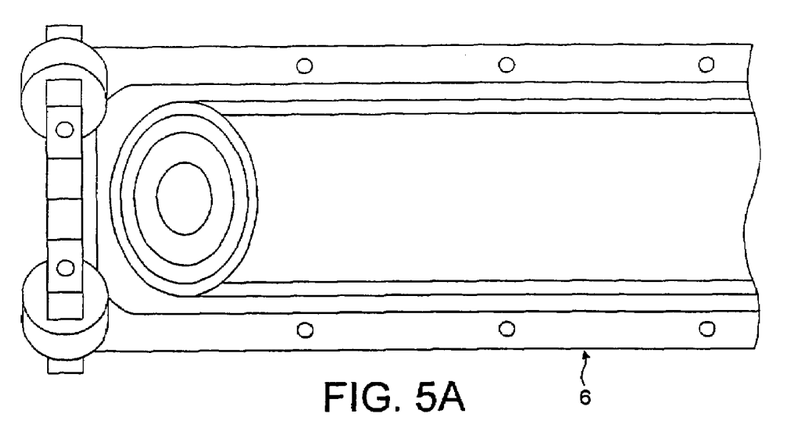
FIGS. 5A-5C show a modification of the embodiment of FIGS. 4A to 4C.
Figure 5B:
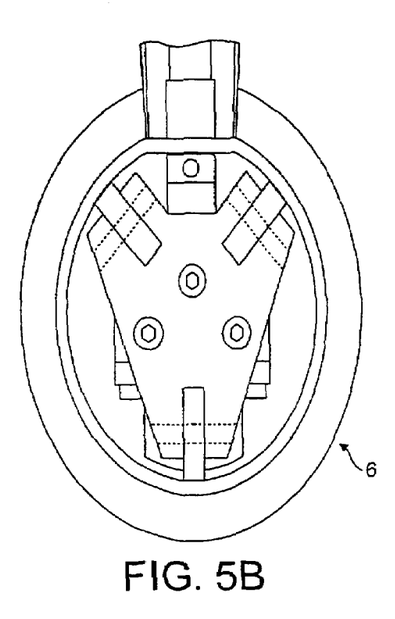
Figure 5C:
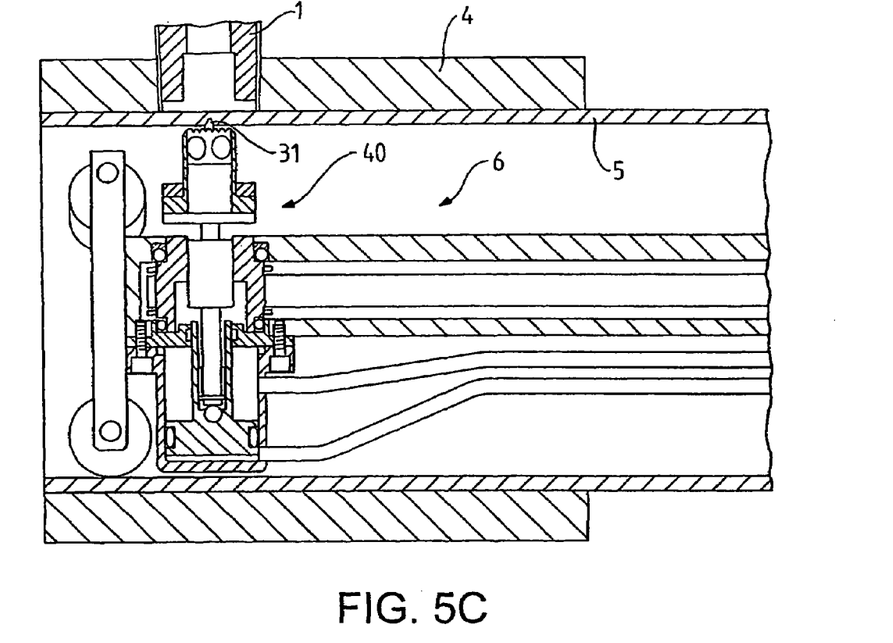
Figure 6:
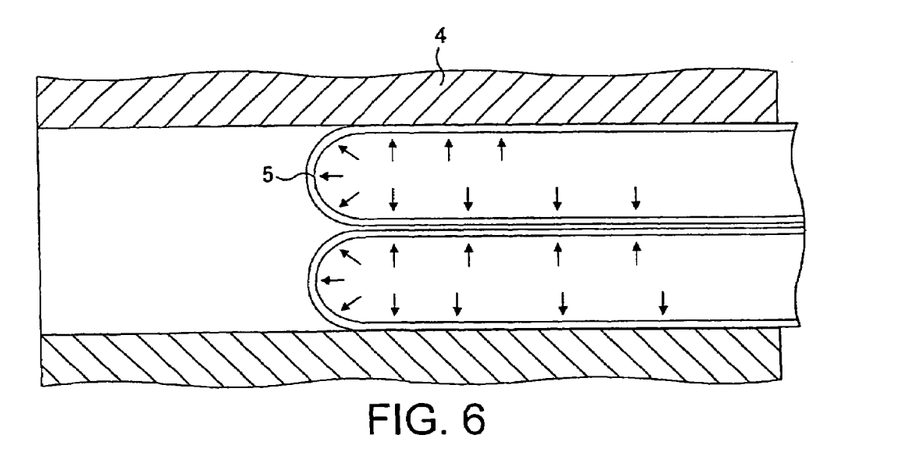
FIG. 6 shows insertion of a liner into a host pipe.

FIGS. 5A-5C show a modification of the embodiment of robot of FIGS. 4A-4C the views being commensurate in FIG. 5, there being shown a penetrating device or insertion finger on which is mounted a connecting element interiorly of which there are equiangularly arranged bores which on rotation of the insertion finger and as it continues to rise into the ferrule are forced outwardly by a tapered surface to expand the wall of the connecting element, upset that wall and lock it mechanically to the previously bored out wall of the ferrule. Turning now to the embodiment shown in FIG. 6, there is shown a method of rehabilitation of a water distribution system by a "soft" insertion lining method using an adhesive 5. In this embodiment, deposits are removed from the inner wall of an existing host pipe or main 4 to provide a smooth corrosion resistant, leak prevention lining or structural lining 5, the lining 5 is everted and pulled through the pipe 4 which lining is everted by forcing the everted lining through the host pipe using pressure usually from applied water pressure or compressed air. The lining is usually either coated with or saturated with a suitable resin which has an epoxy or polyester resin. After the lining is installed, the resin is either allowed to cure at ambient temperature or is more commonly cured by heat, applied by hot water, steam or in some instances by other methods such as by incident ultra-violet light. This ensures intimate contact of the host pipe wall and in some cases the lining has been used to displace water within mains. In this way a maximum flow capacity can be obtained. In some instances, for example lining of sewers, the lining comprises a fibre-reinforced resin while for gas mains linings are pressure rated hoses without any resin addition. Where resin is used, it is used to secure the pipe once inverted onto the pipe wall. When host pipe failure occurs for example owing to ground movement the resin will debond locally around the fracture and this allows the hose to accommodate very large angular and longitudinal movements while still holding pressure and maintaining the structural function of the host pipe. Holes formed in the host pipe owing to external corrosion will also be bridged therefore the host pipe can have its life extended. Mains or host pipes of whatever material preferred can be lined with a system such as described in diameters ranging from 75 mm to 1000 mm.

Thus using the embodiments described herein with reference to the drawings, it is possible to connect a host pipe with a liner to an existing service line or take-off by an existing ferrule, with no leaks and with an operating pressure up to 16 bar with no access required to the outside of the host pipe and therefore avoiding the need to excavate from above ground level. Moreover, strong mechanical support for the liner is provided owing to the connection devices used and moreover, installation can be carried out remotely by robotic equipment operating from within the pipe, and hence from within the liner and penetration of the liner at a ferrule may take place many metres from a base station.

It will be understood that for all the embodiments described herein, the method may suitably comprise enlarging only the ferrule of the ferrule/pipe system.

Moreover, the robotic tool for cutting/enlarging the ferrule may be a multi-shot device which can make a plurality of enlargements in adjacent ferrules at one pass of the apparatus, the device for enlarging the ferrule also being able to create a screw thread or merely an annular groove therein.

The invention claimed is:

1. A method for providing reconnection to a ferrule of a service line from within the bore of a lined host pipe adapted to carry a fluid, comprising the steps of locally enlarging a bore of the ferrule, lining the host pipe with a liner, locating the ferrule from within the lined host pipe, forming a passage for fluid through the liner to the ferrule, and forming a seal of the liner with the ferrule whereby to obviate leakage of fluid between the liner and host pipe.

2. A method according to claim 1, the step of enlarging the bore of the ferrule comprising increasing the diameter of the bore of the ferrule.

3. A method according to claim 2, the step of increasing the diameter of the bore of the ferrule comprising increasing the diameter over only part of the length of the ferrule from the host pipe, whereby to provide a stepped bore through the ferrule.

4. A method according to claim 3, the increased diameter bore being formed to a standard diameter.

5. A method according to claim 4, the step of increasing the diameter of the bore comprising a reaming step.

6. A method according to claim 5, the step of locating the ferrule comprising monitoring changes in electrical impedance of an electrical coil adjacent the interior surface of the host pipe.

7. A method according to claim 6, the step of forming a passage through the liner comprising providing a connection device, and inserting said connection device through the liner into the enlarged part of the bore of the ferrule, whereby to engage the liner between the connection device and in the ferrule.

8. A method according to claim 7, the step of forming a passage through the bore of the liner comprising providing the connection device on an insertion device, inserting the insertion device into the bore by penetration through the liner to open said passage, and securing the connection device in the bore, with the liner secured to the host pipe and ferrule.

9. A method according to claim 8, the connection device being provided as a push-in connection device.

10. A method according to claim 9, the push-in connection device being provided with fastening means whereby it is retained in the enlarged part of the bore of the ferrule.

11. A method according to claim 10, the fastening means comprising an extruded liner part which on pushing in of the liner enters a groove formed in the wall of the ferrule.

12. A method according to claim 11, the insertion device comprising a pointed end having an annular seating at an end opposite the pointed end, the method comprising passing the connection device over the insertion device and supporting it on the annular sealing prior to penetration of the liner.

13. A method according to claim 1, the step of forming a seal comprising providing a connector device, inserting said device in the ferrule from inside the host pipe and securing it in the ferrule whereby to seal the liner in position.

14. A method according to claim 1, the host pipe comprising a plurality of ferrules, the method comprising the step of providing reconnection at each ferrule.

15. A method according to claim 14, comprising the step of locally enlarging a bore of each ferrule of the host pipe system to the same extent at each ferrule.

16. A method according to claim 1, carried out remotely by a robot inserted in the host pipe after lining of the host pipe with the liner.

* * * * *